United States Patent [19]
Yoshikawa

[11] 3,918,120
[45] Nov. 11, 1975

[54] SAFETY CAP FOR THE INNER WIRE OF A BOWDEN CABLE
[75] Inventor: Kunihiko Yoshikawa, Soka, Japan
[73] Assignee: Kabushiki Kaisha Yoshikawa Seisakusho, Tokyo, Japan
[22] Filed: Sept. 19, 1974
[21] Appl. No.: 507,489

[30] Foreign Application Priority Data
Sept. 20, 1973 Japan.............................. 48-109292
Jan. 16, 1974 Japan.................................. 49-7294
Mar. 29, 1974 Japan.............................. 49-35124

[52] U.S. Cl..................................... 16/108; 174/93
[51] Int. Cl.² .......................................... F16L 11/10
[58] Field of Search.......... 174/93, 82; 16/108, 109; 29/277; 135/54; 138/96; 226/196; 287/78, 108; 74/501 R

[56] References Cited
UNITED STATES PATENTS
1,649,923  11/1927  Post...................................... 174/93
3,120,023  2/1964  Ustin.................................... 16/108

Primary Examiner—Geo. V. Larkin
Attorney, Agent, or Firm—Waters, Schwartz & Nissen

[57] ABSTRACT

A safety cap for the inner wire of a Bowden cable in the form of a frustoconical cap-like body made of an elastic material such as rubber, synthetic resin or the like. The body is provided at one end with an inner wire insertion hole and at its outer periphery and in longitudinal direction with at least one slit of V-shaped section. A clamping ring is slidably mounted on the cap-like body. The clamping ring and the cap-like body may be interconnected and integral through a flexible bridge member.

10 Claims, 13 Drawing Figures

SAFETY CAP FOR THE INNER WIRE OF A BOWDEN CABLE

FIELD OF THE INVENTION

This invention relates to safety caps for protecting the terminal ends of the inner wires projecting from outer tubes such as in the case of Bowden cables used, for example, by being attached to the caliper brake units of bicycles.

BACKGROUND

Heretofore, the above-noted kind of cap has been formed of a generally frustoconical cap body of an elastic material such as rubber, synthetic resin or the like provided at one end with a central inner-wire insertion hole. This conventional construction is, however, deficient in that the cap body has a weak holding force and often comes off the associated wire during transportation because the cap body is held on the wire due to the lack of clearance between the insertion hole and the inner wire and the elastic property of the material itself. Further, the mounting of the cap is made more difficult if the fit is made closer in order to strengthen the holding force.

SUMMARY OF THE INVENTION

It is an object of this invention to avoid the above-noted deficiencies and to provide an improved safety cap which has a relatively high holding force and is easy to mount.

To achieve the above and other objects of the invention there is provided an article of manufacture comprising a frustoconical cap-like body having opposite ends and being of elastic material, said body being longitudinally extended and being provided with a peripheral longitudinally extending slot of V-shaped section and with an insertion hole in one of said ends adapted to accommodate a wire or the like.

Preferably, the aforesaid hole is axially disposed in said body and extends only partly through the same.

In accordance with one embodiment of the invention, there may be provided a clamping ring slidably engaged around the cap-like body. Furthermore, there may be provided a flexible bridge member connecting said ring and said body.

In a preferred version of the invention, a flange is provided which is concentric on the body. Moreover, the body may be provided with a further V-shaped slot diametrally opposed to the first said slot.

Where a ring is employed, the ring may be knurled. Moreover, it may be in the form of a cover. Where the flange is provided and a bridge member is also provided, the bridge member may preferably be connected to the flange.

In further accordance with the invention, the article of manufacture may comprise a Bowden cable including concentric inner and outer members, said inner member being fit in the insertion hole in the cap-like body.

The above and further objects, features and advantages of the invention will be found in the detailed explanation which follows hereafter.

BRIEF DESCRIPTION OF DRAWING

This invention will next be explained with reference to the accompanying drawings in which.

DETAILED DESCRIPTION

Figure 1:
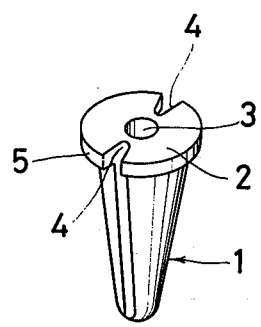
FIG. 1 is a perspective view of a safety cap in accordance with one embodiment of this invention.
Figure 2:
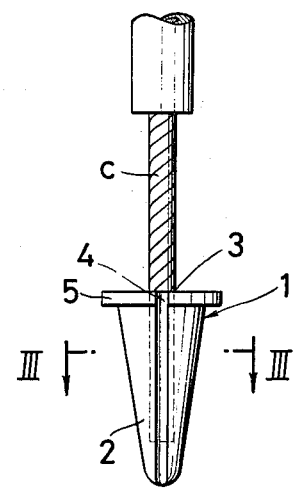
FIG. 2 is an elevational side view of the cap of FIG. 1 installed on the end of a Bowden cable.
Figure 3:
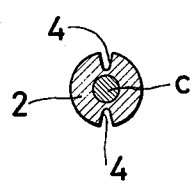
FIG. 3 is a sectional view taken along line III—III in FIG. 2.

As shown in FIGS. 1 to 3, cap 1 is formed of a frustoconical cap-like body 2 made of an elastic material such as rubber, synthetic resin or the like. Cap 2 is provided at the center of one end portion with an axial insertion hole 3 for the insertion of an inner wire c and at its outer periphery with at least one longitudinal slit 4 of V-shaped section. In the illustrated example, it is provided with a pair of slits 4 on diametrally opposite sides of the insertion hole 3. The insertion hole 3 is provided on the bottom end portion of the cap-like body 2, and the cap-like body 2 is provided on its outer periphery with a flange member 5 to provide for handling to facilitate the mounting thereof on the inner wire c.

In the illustrated examples shown in FIGS. 4 to 12, for making more firm the mounting of the cap 1 on the inner wire c, the cap-like body 2 is provided on its outer periphery with a clamping ring adapted for being mounted thereon. The clamping ring 6 is preferably made of the same material as is the cap-like body 2.

Figure 4:
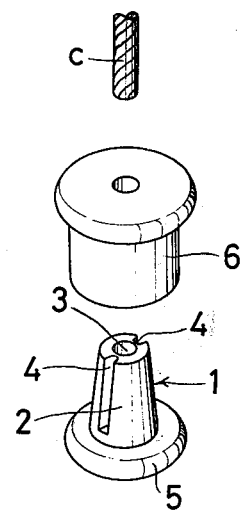
FIG. 4 is a perspective view of another embodiment of this invention in exploded view.
Figure 5:
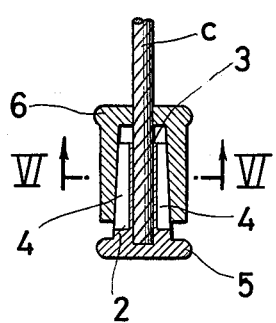
FIG. 5 is a sectional side view of the embodiment of FIG. 4.
Figure 6:
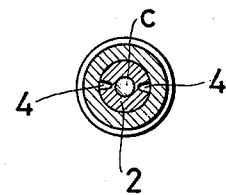
FIG. 6 is a sectional view taken along line VI — VI in FIG. 5.

In the example shown in FIGS. 4 to 6, the insertion hole 3 is made in the top end portion of the frustoconical form of cap-like body 2 and the clamping ring 6 is mounted on the body 2 from the top end thereof so as to be in the form of a cover.

Figure 7:
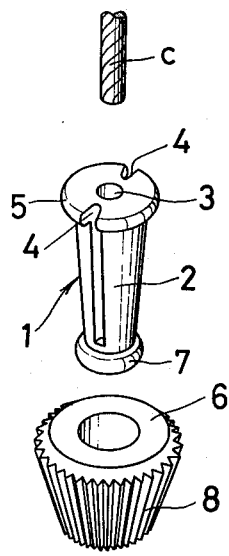
FIG. 7 is a perspective view of another embodiment of this invention.
Figure 8:
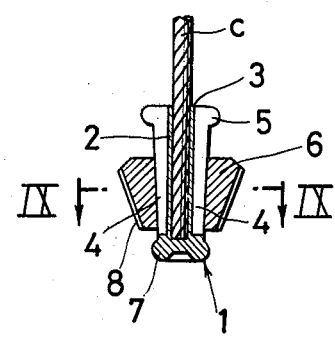
FIG. 8 is a sectional side view of the embodiment of FIG. 7.
Figure 9:
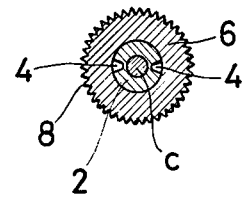
FIG. 9 is a sectional view taken along line IX — IX in FIG. 8.

In the example shown in FIGS. 7 to 9, the insertion hole 3 is made in the bottom end portion of the frustoconical cap-like body 2 and the clamping ring 6 is slidably mounted thereon between the flange member 5 and a top end stopper member 7. The ring 6 is in the form of a knurled piece having on its outer periphery a roulet for nonskid purposes.

Figure 10:
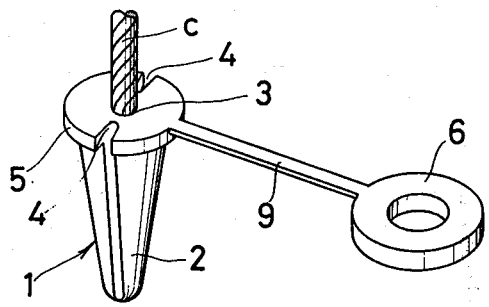
FIG. 10 is a perspective view of another embodiment of this invention.
Figure 11:
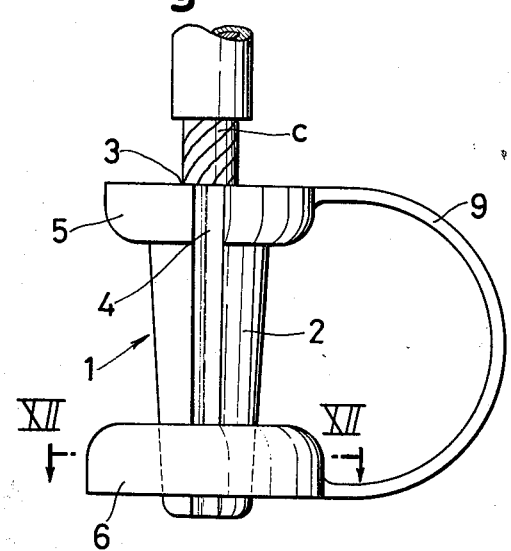
FIG. 11 is a sectional side view of the embodiment of FIG. 10.
Figure 12:
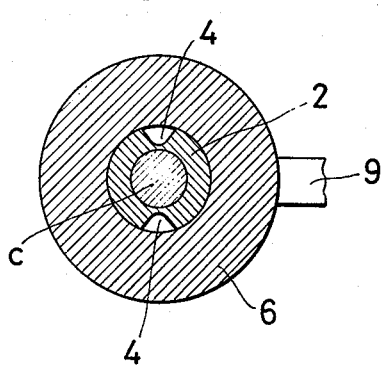
FIG. 12 is a sectional view taken along line XII — XII in FIG. 11.

In the example shown in FIGS. 10 to 12, the insertion hole 3 is made in the bottom end portion of the cap-like body 2 and the clamping ring 6 is of a ring form shaped to be put on the body 2 from the top end thereof. The ring 6 is connected to the cap-like body 2 through a flexible bridge member 9 extending from the flange member 5. The bridge member 9 is preferably made of the same material as the cap-like body 2.

Thus, according to this invention, a frustoconical cap-like body 2 made of an elastic material such as rubber, synthetic resin or the like is provided at one end with an inner wire insertion hole 3 and at its outer periphery with at least one slit 4 of V-shaped section. A resilient force is obtained at the bottom portion of the slit 4 acting to hold the inner wire $c$ which is inserted in the insertion hole 3. If, additionally, a clamping ring 6 is mounted on the outer periphery of the cap-like body 2, the insertion hole 3 is further tightened through deformation of the slit 4 so that the resilient attaching force is further increased. If, additionally, the clamping ring 6 is integrally connected to the cap-like body 2 through a flexible bridge member 9, the clamping ring 6 cannot be lost and its mounting will not be overlooked.

Figure 13:
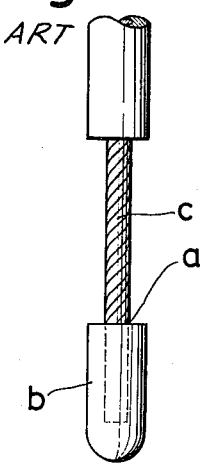
FIG. 13 is an elevational side view of a conventional prior art example.

FIG. 13 is illustrative of an example of the prior art. In FIG. 13, the cap is formed of elastic material and is indicated generally at $b$. It is formed of rubber, synthetic resin or the like and is provided at one end and centrally thereof with an inner wire insertion hole. This conventional construction is more particularly provided with a hole $a$ in which is accommodated a wire $c$. This conventional construction is deficient in that the cap has only a weak holding force and frequently comes off either in use or during transportation because the cap body is only frictionally held on and depends solely upon the relationship of the size of the wire $c$ and the diameter of the hole $a$.

The prior art construction embodies none of the advantages which result from the use of the longitudinally disposed peripheral V-shaped slit employed in accordance with the invention, nor does it embody any of the advantages which inure to the benefit of the use of the slidable ring nor the bridge which is used to connect this ring to the cap-shaped body.

There will now be obvious to those skilled in the art the many modifications and variations of the constructions set forth hereinabove. These modifications and variations will not depart from the scope of the invention if defined by the following claims:

What is claimed is:

1. An article of manufacture comprising a frustoconical cap-like body having opposite ends and being of elastic material, said body being longitudinally extended and being provided with a peripheral longitudinally extended slit of V-shaped section and with an insertion hole in one of said ends adapted to accommodate a wire.

2. An article of manufacture as claimed in claim 1 wherein said hole is axially disposed in said body and extends only partly through said body.

3. An article of manufacture as claimed in claim 2 comprising a flange concentric on said body.

4. An article of manufacture as claimed in claim 2 wherein the body is provided with a further V-shaped slit diametrally opposed to the first said slit.

5. An article of manufacture as claimed in claim 2 comprising a clamping ring slidably engaged around said cap-like body.

6. An article of manufacture as claimed in claim 5 comprising a flexible bridge member connecting said ring and body.

7. An article of manufacture as claimed in claim 6 comprising a flange concentric on said body and wherein the bridge member is connected to said flange.

8. An article of manufacture as claimed in claim 5 wherein said ring is knurled.

9. An article of manufacture as claimed in claim 5 wherein said ring is in the form of a cover.

10. An article of manufacture as claimed in claim 1 comprising a Bowden cable including an inner wire and a concentric outer member on said wire, said wire being fitted in said insertion hole.

* * * * *